June 3, 1947. C. DOERING ET AL 2,421,454
APPARATUS FOR PRODUCING MOLDING DIES AND THE LIKE
Filed July 13, 1942 2 Sheets-Sheet 1

INVENTORS.
CHARLES DOERING.
HENRY H. DOERING.
ERIC W. ANDERSON.
BERTIL J. SKOGLUND.
BY Harry C. Leavitz
ATTORNEY.

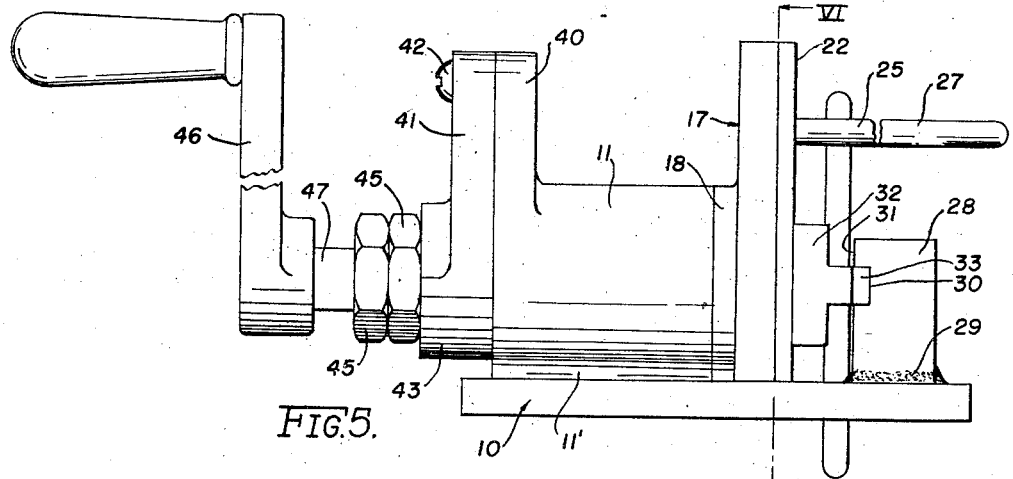
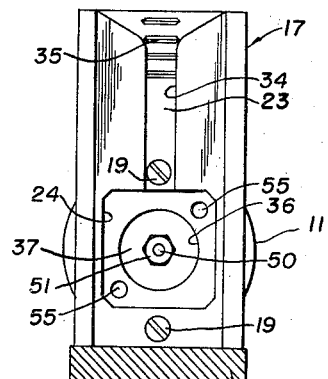
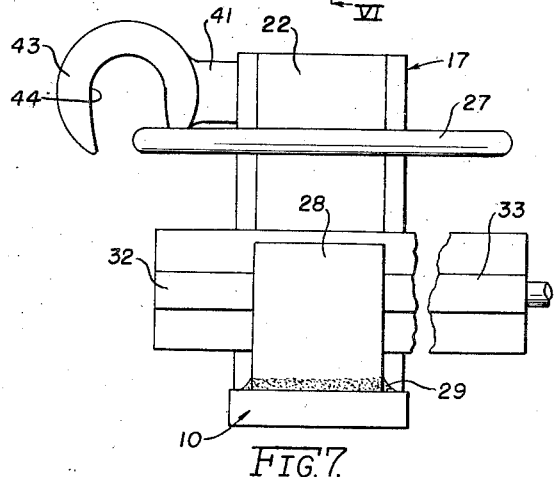
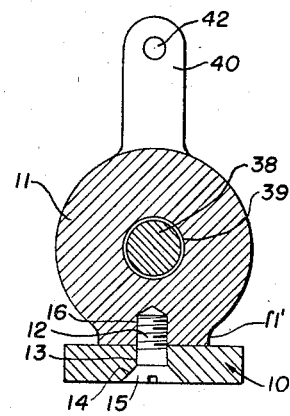
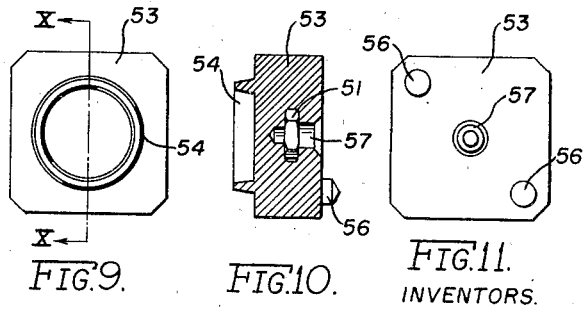

Patented June 3, 1947

2,421,454

UNITED STATES PATENT OFFICE 2,421,454

APPARATUS FOR PRODUCING MOLDING DIES AND THE LIKE

Charles Doering, Henry H. Doering, Eric W. Anderson, and Bertil J. Skoglund, Chicago, Ill.; said Anderson and said Skoglund assignors to said Charles Doering and said Henry H. Doering Application July 13, 1942, Serial No. 450,770

8 Claims. (Cl. 22—67)

This invention relates to method of and apparatus for producing molding dies and more particularly for impression dies used in conjunction with a plastic material such as butter and the like, although teachings of the invention may be employed with equal advantage for other purposes.

It contemplates more especially the provision of an improved method and apparatus for forming molding dies of the type that requires clear cut and comparatively deep restricted formations defining the symbol or facsimile to be impressed upon plastic material of which butter is a relative product that is sold in segmented and specially impressed condition for the market.

One object of the present invention is to provide an improved method of producing molding dies and the like.

Another object is to provide an improved apparatus for improving molding dies and the like.

Still another object is to provide improved means of forming molding dies while the material thereof is in a flowable state and under comparatively high pressure.

A further object is to provide an improved method of producing molding dies while the material thereof is in flowable state and under comparatively high pressure.

A still further object is to provide a simple, more effective, and inexpensive means for producing molding dies while the material thereof is in flowable state and under comparatively high pressure.

Still a further object is to provide improved means for producing molding dies from a master die by resort to high pressure exerted on the forming material while in a flowable state.

Other objects and advantages will appear from the following material of an illustrated embodiment of the present invention.

In the drawings:

Figure 5 is a side view in elevation of the device shown in Figure 1.

Figure 6 is a sectional view in elevation taken substantially along lines VI—VI (Figures 1 and 5).

Figure 7 is a right end view in elevation of the device shown in Figure 5.

Figure 8 is a sectional view in elevation taken substantially along lines VIII—VIII of Figure 1.

Figure 9 is a front view in elevation of the die formed from the master die shown in Figure 4.

Figure 10 is a sectional view in elevation taken substantially along lines X—X of Figure 9.

Figure 11 is a rear view in elevation of the die shown in Figures 9 and 10.

Figure 1:
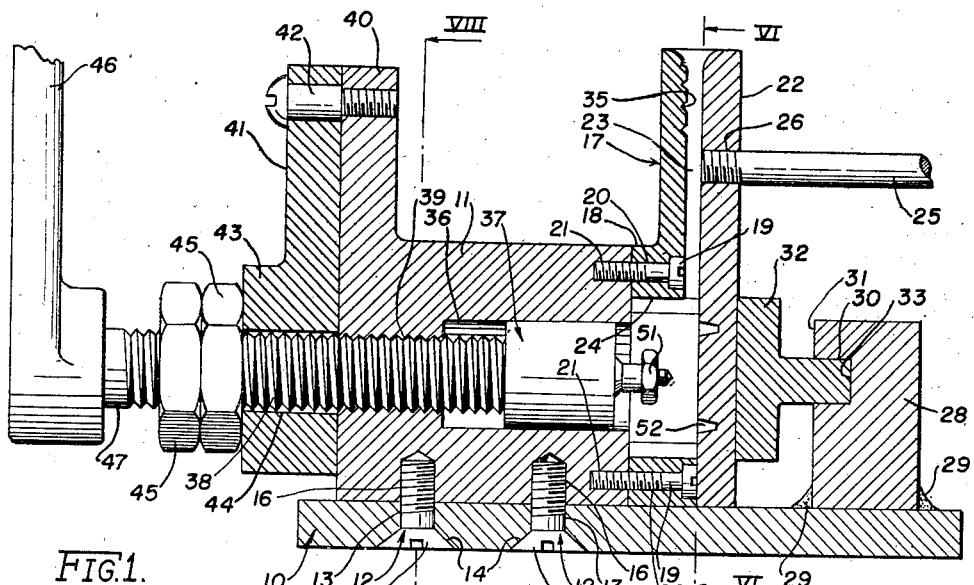
Figure 1 is a fragmentary side sectional view in elevation of a device embodying features of the present invention.
Figure 3:
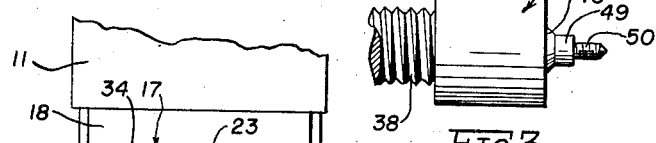
Figure 3 is a fragmentary side view in elevation of the screw operated plunger and another holding pin comprising an element of the device shown in Figure 1.

The structure selected for illustration is not intended to serve as a limitation upon the scope or teachings of the invention, but is merely illustrative thereof. There may be considerable variations and adaptations of all or part of the teachings depending upon the dictates of commercial practice. The method is exemplified by the function of the structure selected for illustration which comprises a base 10 in the form of a substantially rectangular plate which may be attached to a table in any suitable manner or held in a bench vise as depending upon the dictates of commercial practice.

A die body 11, in this instance of substantially cylindrical configuration, has a substantially flat projecting body 11' attached to the base plate 10 by means of suitable fasteners such as machine screws 12, in this instance two. The machine screws 12 project through correspondingly sized apertures 13 having a countersunk recess 14 communicating therewith to accommodate the tapered head 15 of the machine screws 12. The machine screws 12 are disposed longitudinally along the median line of the base plate 10 to engage correspondingly threaded bores 16 provided upwardly through the bottom of the cylindrical die body 11. A molding frame 17, in this instance of substantially U-shaped horizontal cross section, formed with a substantially lateral boss 18 conforming in shape and cross section with the main body 11 for attachment thereto by means of any suitable fastening expedients such as machine screws 19, in this instance two, disposed in countersunk bores 20—21 in axial aligned relation within the die body 11 and molding frame 17.

The molding frame 17 projects upwardly above the die body 11 to conform with a master die frame 22 that serves as a complement thereof to form a gate 23 vertically downward between the molding frame 17 and master die 22 to communicate with the chambered interior 24 of the molding frame 17. The chambered interior 24 constitutes a die body forming chamber as will appear more fully hereinafter.

The master die 22 constitutes a vertically elongated plate having a rod shank 25 readily anchored therein as at 26 to provide a manual handle grasping member 27 at its free extremity to enable the handling of the master die 22 after it absorbs the heat of the molten metal.

In order to maintain the master die 22 in tight confronting contact with the molding frame 17, an anvil 28 is anchored to one extremity of the base plate 10 by welding along the bottom periphery 29, or any other suitable anchoring expedients may be resorted to within the dictates of commercial practice. The anvil projects upwardly for a distance commensurate with the die molding chamber 24 and is horizontally slotted and grooved as at 30 along the inner surface 31 which confronts the master die plate 22.

Figure 2:
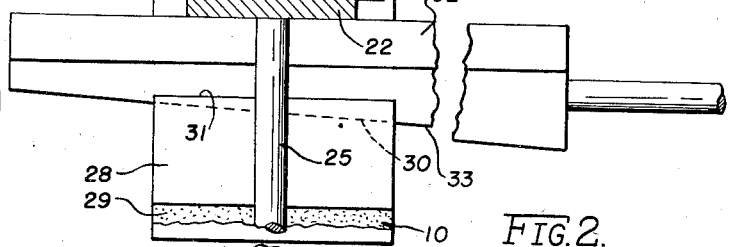
Figure 2 is a fragmentary plan sectional view of the die forming end of the device shown in Figure 1 and more particularly of the master die-holding means.
Figure 4:
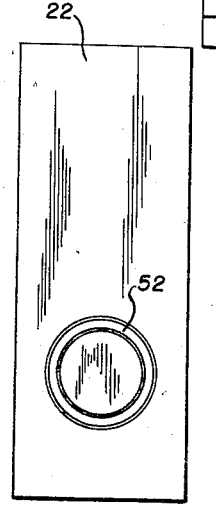
Figure 4 is a front view in elevation of the master die.

A wedge 32 has a tapered ridge 33 for slottable reception within the anvil groove 30. Movement of the wedge 32 with its tapered ridge 33 by forced displacement will establish pressure contact between the master die plate 22 and the correspondingly shaped vertical groove 34 (Figure 2) provided in the molding frame 17 to serve as a closure for the gate 23 and the die body molding chamber 24.

It should be noted that the upper region of the gate 23 in the molding frame 17 is serrated as at 35 to provide an engaging expedient for the chilled slug of material as formed in the upper portion of the gate 23 as will appear more fully hereinafter.

The die body 11 is provided with a horizontally disposed cylinder 36 which communicates with the die body forming chamber 24 to receive a plunger 37 therein for rotary and reciprocal movement to create high pressure in the die body forming chamber 24. To this end, the plunger 37 has an elongated screw shank 38 formed thereon to engage a correspondingly threaded bore 39 provided through the die body 11 in communication with the cylinder 36. The die body 11 has an upstanding flange 40 formed integral therewith to receive a correspondingly shaped end plate 41 that is pivotally connected by means of a shouldered fastening stud 42. The end plate 41 has an enlarged circular boss 43 in the region of the plunger shank 38 for projection through a guide bore 44 provided therethrough. The threaded plunger shank 38 projects beyond the die body 11 and the boss 43 of the guide plate 41 to receive lock nuts 45, in this instance two, that threadedly engage therewith to lock the plunger 37 in its operative position. A plunger shank rotating handle 46 is detachably fixed to the extremity 47 of the threaded plunger shank 38 to impart rotary movement simultaneous with the linear displacement of the plunger 37 in the cylinder 36 to create and release the pressure on the material poured into the die body forming chamber 24 through the gate 23.

It should be noted that the plunger 37 has an axial tapered shoulder 48 formed thereon to merge in a cylindrical shoulder 49 that, in turn, has a reduced threaded pin 50 formed integral in axial alignment therewith. The pin 50, partially threaded, receives a correspondingly threaded brass nut 51 against the shoulder 49 for casting the die body therearound in a manner which will appear more fully hereinafter.

The master die 42 has any suitable design 52, facsimile, or printed indicia, or both, etched, engraved, or otherwise formed therein within the region of the die body forming chamber 24 when the master die plate 22 is in postion. The purpose is to form a die 53 (Figures 9 and 11) with a corresponding design 54, facsimile, or printed indicia thereon, in reference of the master die design, facsimile, or indicia 52, and to provide a clear cut impression the die 53 is formed under large pressure so that the material thereof will enter every minute impression formed in the master die plate 22. The material of the molded die 53 may vary within a wide range, but preferably some low-melting flowable composition such as pewter, antimony, tin, or alloys thereof may be utilized depending upon the dictates of commercial practice.

It should be observed that the molding body 11 is formed with deep recesses 55 (Figure 6) disposed diagonally of each other so that the die 53 will be simultaneously formed with corresponding sized and projecting studs 56 (Figure 11) that serve to index a plurality of dies 53 on a gang plate (not shown) for utilization in an impressing device.

In the formation of dies 53 with the instrumentalities described herein in accordance with method embodying features of the present invention, a brass nut 51 is first screwed on the partially threaded stud 50 comprising part of the plunger 37. The plunger 37 is then retracted to a position approximating one-eighth inch within the cylinder 36 (Figure 1) or for an amount to compensate for the contraction of the metal which is used in the molding of the die 53. This will vary, depending upon the type of composition that is employed. Thereupon, the master die plate 22 is applied to the molding frame 17 for tight contact therewith by the forced displacement of the wedge 32 between the master die plate 22 and the anvil 28. A molding frame 17 and master die plate 22 is then preheated to a range between 250° and 300° Fahrenheit to eliminate all moisture. Any suitable molten mixture or composition such as pewter is poured into the gate 23 between the molding frame 17 and master die plate 22 until the gate 23 is filled to the top.

Thereupon, a wet rag or any cooling expedient is placed at the top of the confronting members 17 and 22 to solidify the top portion of the molten material in the gate 23 to form a slug. The serrations 35 prevent the slug from being extruded from the gate 23 when pressure is applied by displacing the plunger 37 toward the molding chamber 24 of the frame 17. To accomplish this and establish a high pressure approximating 2000 pounds per square inch upon the material in the molding chamber 24 that is now substantially plastic, the handle 46 is rapidly turned to flow the plastic, pewter, or other composition, into the fine die figures 52 or other restrictions that may be part of the design, facsimile, or printed matter or both. This simultaneously compensates for the expansion of the originally molten composition with which the gate 23 and molding chamber 24 is filled and compresses the plastic body to exactly the shape of the molding chamber 24 as well as the facsimile 52 of the master die plate 22.

After this has been accomplished, the molding chamber 24 with its moulded die impressed material under extreme pressure is allowed to cool so that it becomes completely solidified. Then the wedge 32 is removed and the die 53 is extruded from the chamber 24 by turning the handle 46 in the same direction prescribed for creating the extreme pressure in the molding chamber 24. The slug is then removed from the die 53, and the thread of the nut 51 now imbedded in the die 53 is retapped and the die 53 is ready for final trimming should such be required.

The individual dies 53 are then attached to a gang plate in any suitable manner preferably by machine screws which engage the nut 51 disposed centrally in each die 53 which is held against rotation by projecting pins 56 in registry with corresponding apertures provided in the gang plate (not shown).

It will be observed that the shape of the taper 48 and shoulder 49 on the pin 50 provides a corresponding countersunk recess 57 in the completed die 53 to receive a correspondingly shaped machine screw serving as the gang plate attaching expedient.

While we have illustrated and described a preferred embodiment of this invention, it must be understood that the invention is capable of considerable variation and modification without departing from the spirit of the invention. We, therefore, do not wish to be limited to the precise details of construction set forth, but desire to avail ourselves of such variations and modifications as come within the scope of the appended claims.

We claim:

1. In a device of the character described, the combination with a molding chamber, of moveable plunger means complemental to a wall portion of said molding chamber, a threaded stud extension axially associated with said plunger means for positioning in said molding chamber to afford casting a die around a nut, and means for displacing said moveable plunger means relative to said molding chamber to vary the size of said chamber for subjecting the chamber contents while in a fluid state to a substantial pressure.

2. In a device of the character described, the combination with a molding chamber, of moveable plunger means complemental to a wall portion of said molding chamber, a threaded stud extension axially associated with said plunger means for positioning in said molding chamber to afford casting a die around a nut, a pattern plate detachably associated with said molding chamber to complete the chamber enclosure, and means for displacing said moveable plunger means relative to said molding chamber to vary the size of said chamber for subjecting the chamber contents while in a fluid state to a substantial pressure.

3. In a device of the character described, the combination with a molding chamber, of moveable plunger means complemental to a wall portion of said molding chamber, a threaded stud extension axially associated with said plunger means for positioning in said molding chamber to afford casting a die around a nut, a pattern plate detachably associated with said molding chamber to complete the chamber enclosure, said pattern plate being in spaced confronting relation with a wall of said molding chamber to define a gate to pour molten metal therethrough to fill said molding chamber, and means for displacing said moveable plunger means relative to said molding chamber to vary the size of said chamber for subjecting the chamber contents while in a fluid state to a substantial pressure.

4. In a device of the character described, the combination with a molding chamber, of a pattern member detachably associated with said molding chamber to comprise a complement thereof, moveable plunger means complemental to a wall portion of said molding chamber, a threaded stud extension axially associated with said plunger means for positioning in said molding chamber to afford casting a die around a nut, means for detachably supporting said pattern member against a complemental portion of said molding chamber, and means for displacing said movable plunger means relative to said molding chamber to vary the size of said chamber for subjecting the chamber contents while in a fluid state to a substantial pressure.

5. In a device of the character described, the combination with a molding chamber, of a pattern member detachably associated with said molding chamber to comprise a complement thereof, moveable plunger means complemental to a wall portion of said molding chamber, a threaded stud extension axially associated with said plunger means for positioning in said molding chamber to afford casting a die around a nut, wedge means for detachably supporting said pattern member against a complemental portion of said molding chamber, and rotary means for displacing said moveable plunger means relative to said molding chamber to vary the size of said chamber for subjecting the chamber contents while in a fluid state to a substantial pressure.

6. In a device of the character described, the combination with a molding chamber, of a pattern member detachably associated with said molding chamber to comprise a complement thereof, moveable plunger means complemental to a wall portion of said molding chamber, a threaded stud extension axially associated with said plunger means for positioning in said molding chamber to afford casting a die around a nut, means for detachably supporting said pattern member against a complemental portion of said molding chamber, and means for displacing said moveable plunger means relative to said molding chamber to vary the size of said chamber for subjecting the chamber contents while in a fluid state to a substantial pressure.

7. In a device of the character described, the combination with a molding chamber, of a pattern member detachably associated with said molding chamber to complete the chamber enclosure moveable plunger means complemental to a wall portion of said molding chamber, a threaded stud extension axially associated with said plunger means for positioning in said molding chamber to afford casting a die around a nut, means for detachably supporting said pattern member against a complemental portion of said molding chamber, and rotary means for displacing said moveable plunger means relative to said molding chamber to vary the size of said chamber for subjecting the chamber contents while in a fluid state to a substantial pressure.

8. In a device of the character described, the combination with a molding chamber, of a pattern member detachably associated with said molding chamber to complete the chamber enclosure moveable plunger means complemental to a wall portion of said molding chamber, a threaded stud extension axially associated with said plunger means for positioning in said molding chamber to afford casting a die around a nut, means for detachably supporting said pattern member against a complemental portion of said molding chamber, screw means for displacing said moveable plunger means relative to said molding chamber to vary the size of said chamber for subjecting the chamber contents while in a fluid state to a substantial pressure, and a handle fixed to said screw means for imparting rotation thereto to effect linear displacement of said plunger means relative to said molding chamber.

CHARLES DOERING.
HENRY H. DOERING.
BERTIL J. SKOGLUND.
ERIC W. ANDERSON.

REFERENCES CITED

The following references are of record in the file of this patent:

UNITED STATES PATENTS

| Number | Name | Date |
|---|---|---|
| 534,665 | Potter | Feb. 26, 1895 |
| 298,580 | Heiss | May 13, 1884 |
| 416,705 | Aiken | Dec. 10, 1889 |
| 1,347,728 | Wills | July 27, 1920 |
| 211,070 | French | Jan. 7, 1879 |